W. CAPLE.
MOTOR GENERATOR DRIVE.
APPLICATION FILED JULY 11, 1921.
1,413,158.
Patented Apr. 18, 1922.
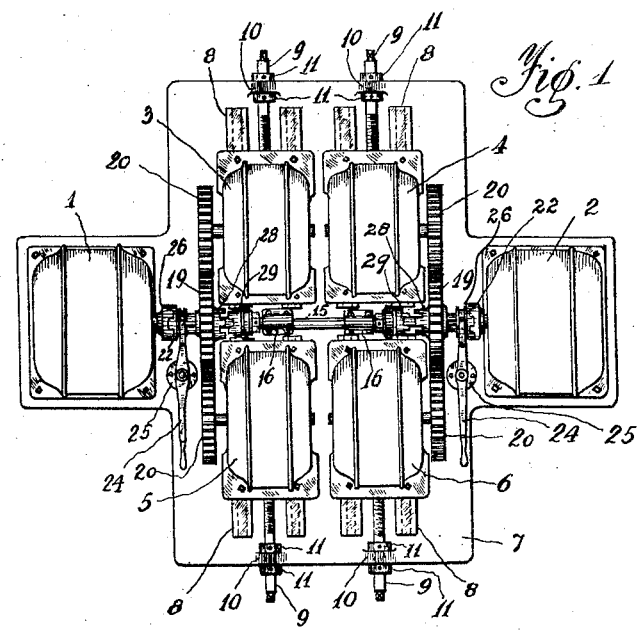
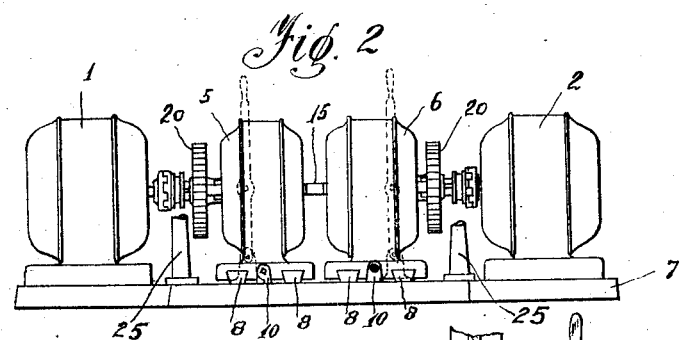
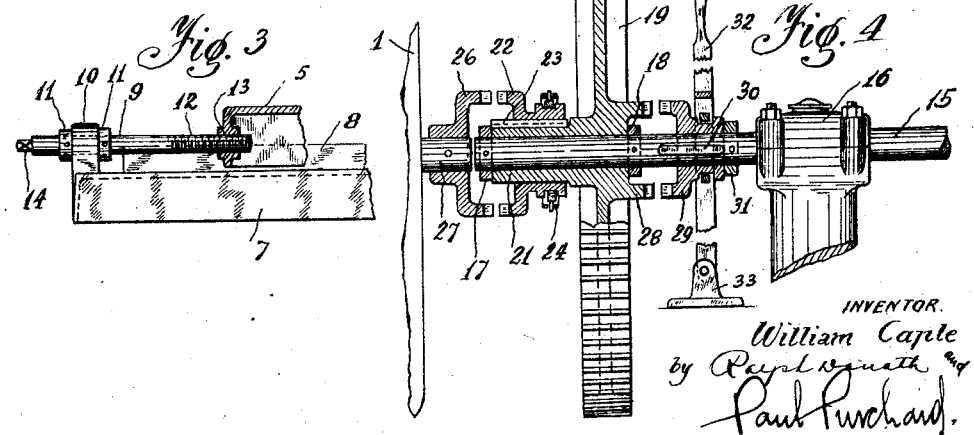
INVENTOR.
William Caple
by Paul Purchard
Attorneys

UNITED STATES PATENT OFFICE.

WILLIAM CAPLE, OF HOMESTEAD, PENNSYLVANIA.

MOTOR-GENERATOR DRIVE.

1,413,158.  Specification of Letters Patent.  Patented Apr. 18, 1922.

Application filed July 11, 1921. Serial No. 483,741.

*To all whom it may concern:*

Be it known that I, WILLIAM CAPLE, a citizen of the United States, residing at Homestead, in the county of Allegheny and State of Pennsylvania, have invented certain new and useful Improvements in Motor-Generator Drives, of which the following is a specification.

This invention relates to special systems for connecting prime movers to other power generators or power absorbing devices and more especially to a method of driving electric generators by electric motors.

One of the principal objects of the invention is to provide a self contained installation whereby two generators may be driven individually by their respective motors. Another object is to provide an arrangement whereby each set of generators may be driven by either one of the motors while the other is disconnected. A further object is to provide a mechanical arrangement whereby any combination of one, two or three generators may be driven from either one of the motors. The means for achieving these various objects and further features of my invention will appear from the following description taken in connection with the drawings which form a part of this application.

My invention is especially useful in steel mills, electro-metallurgical, electro-chemical and other industries where electric currents of various voltages and characteristics are required in the operation of the industry. My device is also very well adapted to take care of emergencies where either a motor or a generator has to be disconnected with the minimum loss of time and without affecting the operation of the remaining part of the system on account of break downs or other unforeseen accidents.

The preferred method employed for obtaining the above mentioned results is clearly illustrated in the accompanying drawings in which:

Fig. 1 is a general top plan view showing the motors and generators with the driving mechanism.

Fig. 2 is a side elevation corresponding to Figure 1, with a part of the lever mechanism employed in my device broken off for the sake of greater clearness.

Fig. 3 is an enlarged fragmentary view, shown partially in section, illustrating one method of shifting any one of the generators in or out of engagement with the driving power.

Fig. 4 is an enlarged fragmentary view, mostly shown in section, illustrating the most important parts of my driving mechanism.

Referring to the drawings, my arrangement consists of two motors (or any prime movers) 1 and 2 and of the four generators (or other power transmitting mechanisms) 3, 4, 5 and 6 mounted upon a common base 7. The motors 1 and 2 are stationarily mounted upon said base, whereas each of the four generators is mounted upon the rails 8, cast integrally with the base. Said generators are slidable upon said rails by means of the screws 9 mounted for rotation in the lugs 10 and secured thereon against longitudinal displacement by means of the collars 11 fastened upon said screws. The threaded parts 12 of the screws engage suitably tapped apertures 13 provided in the foot of each of said generators, whereby they can be moved by applying a suitable wrench on the squared end 14 of said screws.

Intermediate the motors, and in axial alignment with the shafts thereof, is mounted for rotation the independent shaft 15 supported in the bearing stands 16. Loosely mounted upon said independent shaft, and secured thereon against axial displacement by the collars 17 and 18 are the toothed gears 19 which engage the corresponding gears 20 driving the generators. Upon the extension 21 of the hubs of said loose gears I provide the claw-clutch-halves 22 slidably secured thereon for rotation by means of the flat keys 23. Each claw-clutch 22 is brought into or out of engagement by means of a bifurcated lever 24, (fulcrumed on a standard 25) with a corresponding clutch-half 26, secured on the inner extension of each motor shaft 27. The construction of said lever and its support being of the usual design used in connection with this type of clutches, a detailed representation thereof has not been deemed necessary.

Each loose gear 19 is provided opposite the hub extension 21 with a claw-clutch-half 28, secured or cast integrally thereon. A corresponding clutch-half 29 is slidably secured for rotation with the shaft 15 by means of the flat key 30, and limited in its travel in the direction away from the clutch 28 by a collar 31 secured upon said shaft. The axial shifting of the claw-clutch-half 29 is performed by a bifurcated lever 32, of customary construction, rockably mounted in a support 33 secured upon the base 7.

Having thus described the principal elements embodied in my invention, the operation thereof will be easily understood and is as follows:

In the normal operating condition illustrated in Figure 1, each group of generators 3 and 5 or 4 and 6 will be driven respectively by its corresponding motor 1 or 2. It will be noted that in this case the motor power is transmitted to the generators by shifting the claw-clutch-halves 22 into engagement with clutch-halves 26, the other sets of clutches 28 and 29 being out of engagement.

If an emergency requires that either one of the generators be disconnected from the system, it is done by sliding the generator outwardly and out of engagement with the gears 19 by means of the screw 9.

When both generators of a group are to be disconnected, the engagement between the claw-clutch-halves 22 and 26 is broken and the corresponding motor is, or may be, stopped.

Again, if both generators of a group and a generator of the other group are to be disconnected, the generators of the same set are disconnected by the disengagement of the claw-clutch 22—26 and the screw 9 disconnects the other generator in the manner just described.

Assuming that the motor 1, should for any reason have to be stopped and disconnected, the power required by all four generators will be furnished by the remaining operative motor in the following manner: The claw-clutch-halves 22 and 26 corresponding to motor 1, are disengaged and both sets of claw-clutches 28 and 29 are brought into engagement. With this arrangement it will be noted that the power from the motor 2, will be transmitted to the generators 3 and 5 through the intermediate shaft 15, as well as to the adjacent generators 4 and 6.

From the above description it will be seen that all reasonable emergencies which may occur in my power plant are readily taken care of with the minimum loss of time.

Although my invention is primarily intended to be applied in connection with electric motors and generators, it will be readily understood that the transmission of power from any prime mover to any kind of power transmitting mechanism could be performed in a similar manner and I wish to reserve myself the right of interpreting the claims of this invention in that light.

It will be understood, of course, that the arrangement I have herein shown is merely suggestive of many that might be adopted in carrying out my invention, and I do not wish to be limited to the construction illustrated otherwise than as specified in appended claims.

What I claim is:—

1. In combination, two groups of two generators, a motor for each of said groups; a common stationary base for said generators and motors; an independent shaft rotatably mounted in axial alignment and intermediate said motors; a gear secured on the outward end of the shaft of each of said generators; two gears freely mounted for rotation on said intermediate shaft and axially secured for engagement with their respective sets of generator gears and means for connecting each of said freely mounted gears with its adjacent motor.

2. In combination, two groups of two generators, a motor for each of said groups; a common stationary base for said generators and motors; an independent shaft rotatably mounted in axial alignment and intermediate said motors; a gear secured on the outward end of the shaft of each of said generators; two gears freely mounted for rotation on said intermediate shaft and axially secured for engagement with their respective sets of generator gears and means for selectively connecting each of said freely mounted gears with either one of said motors.

In testimony whereof I affix my signature.

WILLIAM CAPLE.